US005397550A

United States Patent [19]
Marino, Jr.

[11] Patent Number: 5,397,550
[45] Date of Patent: Mar. 14, 1995

[54] CATALYTIC CONVERTER AND CLEANING SYSTEM

[76] Inventor: Robert R. Marino, Jr., 6130 Stoney Hill Rd., New Hope, Pa. 18938

[21] Appl. No.: 194,917

[22] Filed: Feb. 14, 1994

[51] Int. Cl.⁶ .......................... B01D 37/20; F01N 3/02
[52] U.S. Cl. ...................... 422/178; 422/177; 422/168; 60/311; 60/303; 60/295; 60/274; 55/DIG. 10; 55/DIG. 30; 502/34; 502/56; 423/212; 423/213.2
[58] Field of Search .......................... 422/168, 173–174, 422/177–178; 423/212, 213.2, 215.5; 60/295, 303, 311, 274; 55/DIG. 10, DIG. 30; 502/38, 34, 55–56

[56] References Cited

U.S. PATENT DOCUMENTS

| 4,276,066 | 6/1981 | Bly et al. ................. 60/311 |
| 4,456,457 | 6/1984 | Nozawa et al. ......... 55/DIG. 10 |
| 4,505,106 | 3/1985 | Frankenberg et al. ....... 422/178 |
| 4,522,028 | 6/1985 | Hasegawa et al. ........ 55/DIG. 10 |
| 4,544,388 | 10/1985 | Rao et al. ................. 60/311 |
| 4,686,827 | 8/1987 | Wade et al. .............. 60/303 |
| 4,735,639 | 4/1988 | Johnstone ............... 55/DIG. 3 |
| 4,875,336 | 10/1989 | Hayashi ................ 55/DIG. 30 |
| 4,902,309 | 2/1990 | Hempenstall ........... 55/DIG. 10 |
| 4,991,395 | 2/1991 | Markou et al. ............ 60/295 |
| 5,230,872 | 7/1993 | Tiggelbeck et al. ......... 502/55 |

Primary Examiner—Robert J. Warden
Assistant Examiner—Hien Tran
Attorney, Agent, or Firm—Gregory J. Gore

[57] ABSTRACT

A ceramic exhaust trap regenerator provides a push-pull heat channeling method of transferring heat to and through the ceramic monolith with a flow of superheated air. The application of heat is controlled by pulling the hot air through the monolith and away from the downstream side of the monolith through a vacuum hose. The regeneration process is started and completely controlled by an off-board mobile regeneration console with the engine off. The console is a wheeled cart with attachments that include an air heater, vacuum and positive pressure air pumps with attaching hoses, a temperature-actuated relay, a particulate filter, process timers, a heat exchanger, a cooling fan, and an electrical controller.

17 Claims, 5 Drawing Sheets

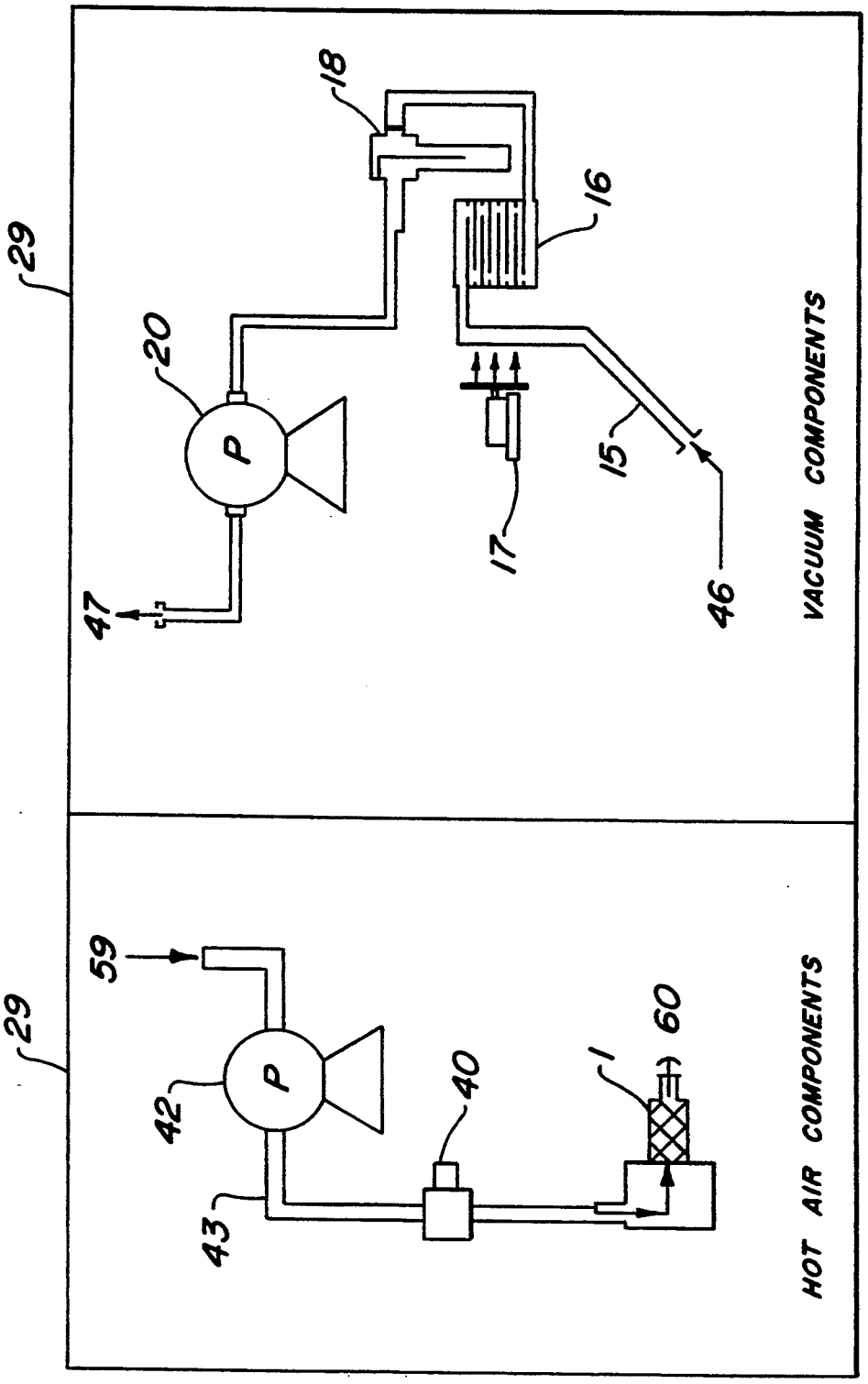

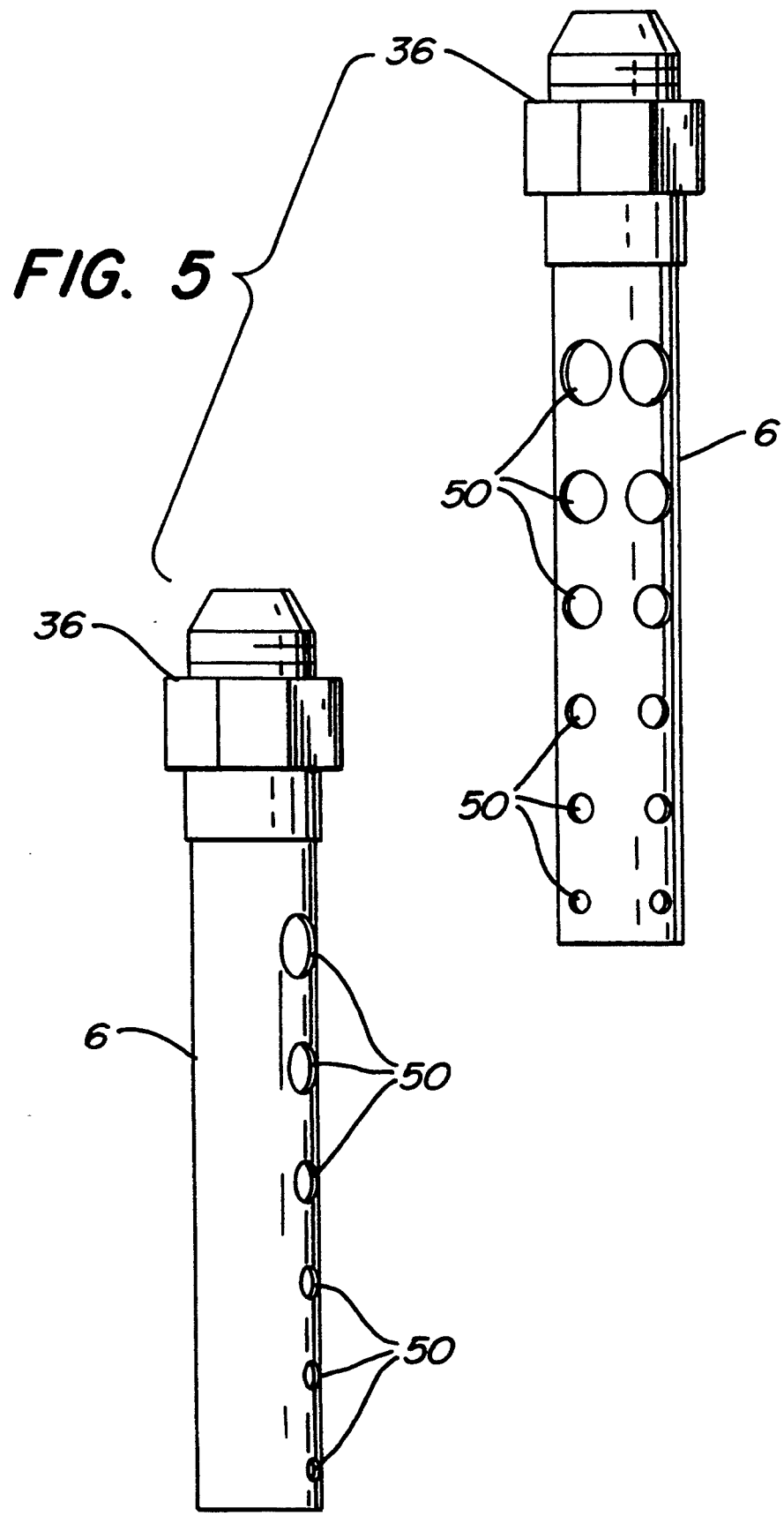

though there is a high electric current requirement to produce sufficient heat to start the regeneration process. This amount of power is not readily available on motor vehicles and, typically, this power deficiency requires complex means to sequence, control or ration electrical consumption. In addition, these on-board systems require the engines to be running to utilize some part of the vehicle exhaust.

CATALYTIC CONVERTER AND CLEANING SYSTEM

FIELD OF THE INVENTION

This invention relates to catalytic converters for the exhaust of internal combustion engines. More specifically, this invention pertains to a catalytic converter suitable for heavy-duty diesel engine use, and a unique method of cleaning the accumulated carbon build-up.

BACKGROUND OF THE INVENTION AND DESCRIPTION OF PRIOR ART

Recent, more stringent government regulation of heavy duty diesel engine tailpipe emissions has required new means to reduce these emissions. These regulations cover both new vehicles and existing vehicles. The two most common emissions control devices are the catalytic converter and the carbon particulate trap. Both devices contain and utilize a honeycomb monolith as the active component.

Internally, catalytic converters contain a channeled, ceramic monolith, through which the exhaust gas passes. Viewed from the entrance port, the ceramic monolith resembles a honeycomb structure and may have as many as 400 entrance cells (channels) per square inch. The surface area along the length of these channels is carefully impregnated with precious metals and is extremely porous to increase contact surface area. The precious metals create a catalytic reaction when combined with heat, excess oxygen and noxious exhaust gasses. The catalytic reaction converts unburned hydrocarbon, carbon monoxide and oxides of nitrogen into non-toxic carbon dioxide and water. In addition to creating a catalytic reaction with exhaust gasses, catalytic converters also collect carbon particulate matter (black soot). Catalytic converters create heat during the catalytic reaction that can burn a portion of carbon particulate matter as the exhaust passes through the monolith structure.

Particulate traps are similar to catalysts, as they both use a ceramic monolith as the basic component, but traps are designed only to collect carbon particulate matter in diesel exhaust. Typically, the exhaust channels along the surface of the trap monolith are configured with carefully designed obstructions. This special ceramic monolith surface collects a high percentage of suspended carbon particles and quickly coats with black soot. Trap-type ceramic monoliths have additionally been coated with precious metals, which may only temporarily behave as a reduction catalyst as they quickly become coated with carbon material and need to be cleaned. To this point, however, no device or system has been presented which performs primarily as a reduction catalyst for heavy-duty diesel engine exhaust.

Prior on-board, self-cleaning carbon traps, such as disclosed in U.S. Pat. No. 4,544,388, quickly become filled with particulate matter and need to be routinely regenerated (cleaned) to maintain a level of efficiency. Heretofore, cleaning has required complicated and expensive on-board systems contributing to both complexity and cost. To regenerate a trap device, intense heat must be applied to initiate the ignition and chain reaction combustion of the accumulated carbon. The most common and practical heating methods use on-board electric resistance heaters as disclosed in U.S. Pat. No. 4,516,993. Unfortunately, there is a high electric current requirement to produce sufficient heat to start the regeneration process. This amount of power is not readily available on motor vehicles and, typically, this power deficiency requires complex means to sequence, control or ration electrical consumption. In addition, these on-board systems require the engines to be running to utilize some part of the vehicle exhaust.

Another problem is that after ignition, during regeneration, prior art devices depend upon burning particulate on the surface of the ceramic monolith to generate additional heat to carry out the process fully. There is a high likelihood of overheating during this chain reaction which can cause damage to the monolith. Also, complete regeneration must be attained by a single ignition because there is no provision for re-ignition after regeneration has begun. Furthermore, exhaust bypass valves and separate means to bring oxygen-rich air into the process are required. Due to the complexity and cost associated with this approach, it tends to be problematic and not cost effective for retrofit application.

Other prior devices locate electric resistance heaters in close proximity or directly attached to the surface of the monolith as disclosed in U.S. Pat. No. 4,456,457. Application of heat to specific locations on the monolith face will provide particulate ignition points at desirable multiple points across the face and then down its length. This type of system is disclosed in U.S. Pat. No. 4,331,454 in which a short initial burst or sequence of short bursts of heat light off the face on specific points in the catalyst. This is done with the engine running. In other prior art systems, such as disclosed in U.S. Pat. No. 4,686,827, after initial carbon light-off, re-combustion continues to burn without any further assistance from a heater. Hence, the carbon tends to burn hot and fast without direct control, while migrating around and along the catalyst. To protect against overheating, elaborate heat defusers have been used to protect the ceramic monolith from intense radiant heat from electric heat elements. In addition, deflectors as disclosed in U.S. Pat. No. 4,276,066 have been used to carefully aim the heat in an attempt to create a burn pattern least likely to result in overheating the monolith. The above-mentioned patents represent the closest prior art of which the applicant is aware.

Reducing diesel engine emissions with catalytic converters and particulate traps is well established, however, clogging and cleaning difficulties due to collection of carbon particles on the monolith have prevented the wide use of carbon traps and, in particular, prevented use of emission-reduction catalytic converters with heavy-duty diesel engines. Although self-cleaning particulate traps have been tried, no prior device is known which successfully cleans the particulate build-up on Catalytic converters of diesel engine exhaust. No device is known that will regenerate the ceramic monolith structures of catalysts or traps from a central service point utilizing heated air as the igniter, controlled from an external source without assistance from the motor.

There is therefore a need in the internal combustion exhaust emission arts for cleaning a diesel engine exhaust filtration system to reduce emissions which: is not limited by available vehicle power; is inexpensive to produce, install and operate; will not overheat or produce any undesirable side effects during operation; and can inexpensively clean an exhaust catalyst or trap through complete regeneration at maintenance intervals as desired.

SUMMARY OF THE INVENTION

The major components of the present invention are a catalytic converter and an off-board cleaning device. The reduction catalyst (catalytic converter) reduces hydrocarbon, carbon monoxide and oxides of nitrogen of the diesel internal combustion engine exhaust. This reduction catalyst has a honeycomb-type structure and will burn off, capture and collect carbon particulate from the exhaust gas stream. The reduction catalyst component of this invention is primarily a HC, CO and NOX reduction catalyst. During use, the internal ceramic monolith component will slowly collect carbon particulate matter and ultimately clog. Eventually, this progression will cause undesirable exhaust back pressure, loss of power, loss of catalyst efficiency, and cleaning will then be required. However, the present invention easily provides the necessary cleaning.

The invention utilizes a mobile off-board regeneration apparatus that can provide a centralized regeneration station for many vehicles. The main components of the off-board apparatus (hereinafter called "console") are contained in a wheeled cart with attachments that include an air heater, vacuum and positive-pressure air pumps with attaching hoses, a temperature-actuated relay, a particulate filter, process timers, a heat exchanger, a cooling fan, and other electrical components needed to perform the regeneration process.

The present invention provides a unique push-pull heat channeling method of transferring heat to and through the ceramic monolith with a flow of super-heated air. The application of heat is controlled by pulling air away from the downstream side of the monolith through a vacuum hose. By creating a negative pressure to induce the hot airflow through the monolith, less positive pressure needs to be applied upstream of the monolith, thus reducing overheating in that area. The regeneration process is started and completely controlled by the mobile regeneration console with the engine off. Because this device does not rely on any engine exhaust heat or flow to complete the process, the re-combustion air is beneficially oxygen-rich. The engine exhaust pipe upstream of the monolith is left unobstructed during regeneration, without requiring a close off valve.

The use of an off-board heat source reduces present per catalyst or per trap unit costs that would be required to fit every vehicle with an elaborate heat source, by-pass systems and other related equipment and replaces them with a single mobile heat console capable of meeting the regenerating needs of up to thirty vehicles. Thus, it completely eliminates all active on-board systems and any restrictions imposed by them. Depending upon vehicle driving patterns, catalyst regeneration intervals can be spaced to several hundred hours of vehicle operation.

The present invention solves the problems associated with available electric power, heat source, heat distribution and carbon burn rate regulation experienced with other catalysts and traps during regeneration. Furthermore, this invention permits the temperature of the regeneration air to be completely controlled without complicated and expensive heat source deflectors or defusers. There are no uncontrolled local overheating effects which can be caused by unobstructed radiant heat from resistance-heating elements. This new system has no on-board power limitations and directs heat at multiple points on the ceramic monolith simultaneously. In addition, the entire monolith structure can be gradually ramped up to full temperature 1200° F. without the aid of combusting carbon.

Other objects, advantages and novel features of the invention will become apparent from the following detailed description of the invention when considered in conjunction with the accompanying drawings.

BRIEF DESCRIPTION OF THE DRAWINGS

FIG. 4 depicts mechanical diagrams of the regeneration console air handling components.

FIG. 5 shows views of the hot air channeling tube.

DESCRIPTION OF THE PREFERRED EMBODIMENT

Figure 1:
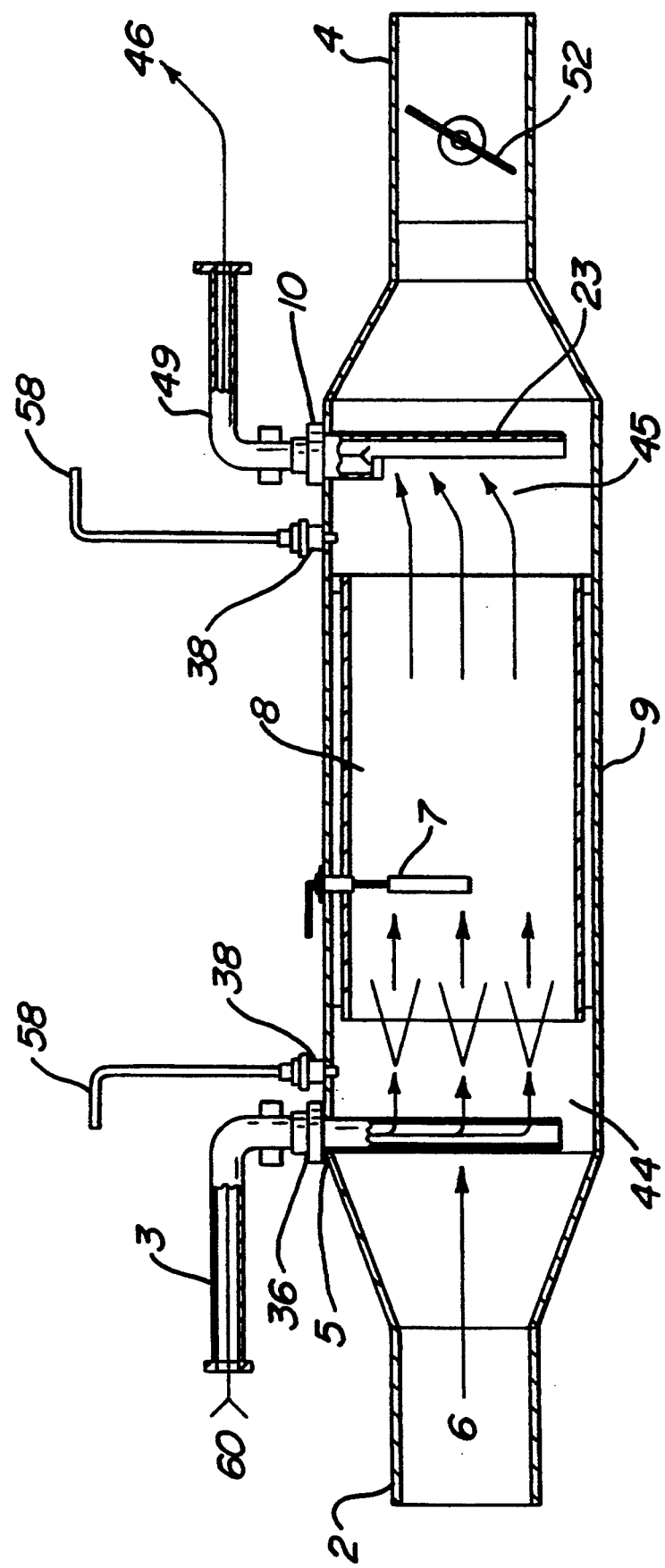
FIG. 1 is a side diagrammatic view of the catalytic converter of the present invention.

The catalyst of the present invention is fitted with specific components which are required for regeneration that have not heretofore been used on diesel exhaust reduction catalysts. Referring to FIG. 1, the catalytic converter of the invention includes: super-heated air intake port 5, internal regeneration air channeling tube 6, a temperature sensor 7, a vacuum probe 23, and a vacuum port 10. These structures are added to a conventional catalytic converter which includes casing 9 that surrounds a ceramic monolith 8. The entrance to the casing is attached to a diesel engine exhaust pipe 2, and a tailpipe 4 is fitted to the downstream exit. Differential pressure sensor ports 38 located upstream and downstream of the monolith are attached by connecting lines 58 to pressure sensing means which determine when the monolith requires cleaning. The vacuum hose 15 is an insulated flexible steel tube which attaches to a vacuum port 10 of the catalyst case 9 through tube 49. During regeneration, the heat supply module 1 is attached to intake port 5 on the catalyst casing and delivers super-heated air 60 through a hose 3 under low pressure which flows out exit holes in the channeling tube 6 located just upstream of the catalyst. The heated air directly impacts the monolith at multiple points on the face of the monolith 8. Details of the channeling tube are more clearly depicted in FIG. 5.

Figure 2:
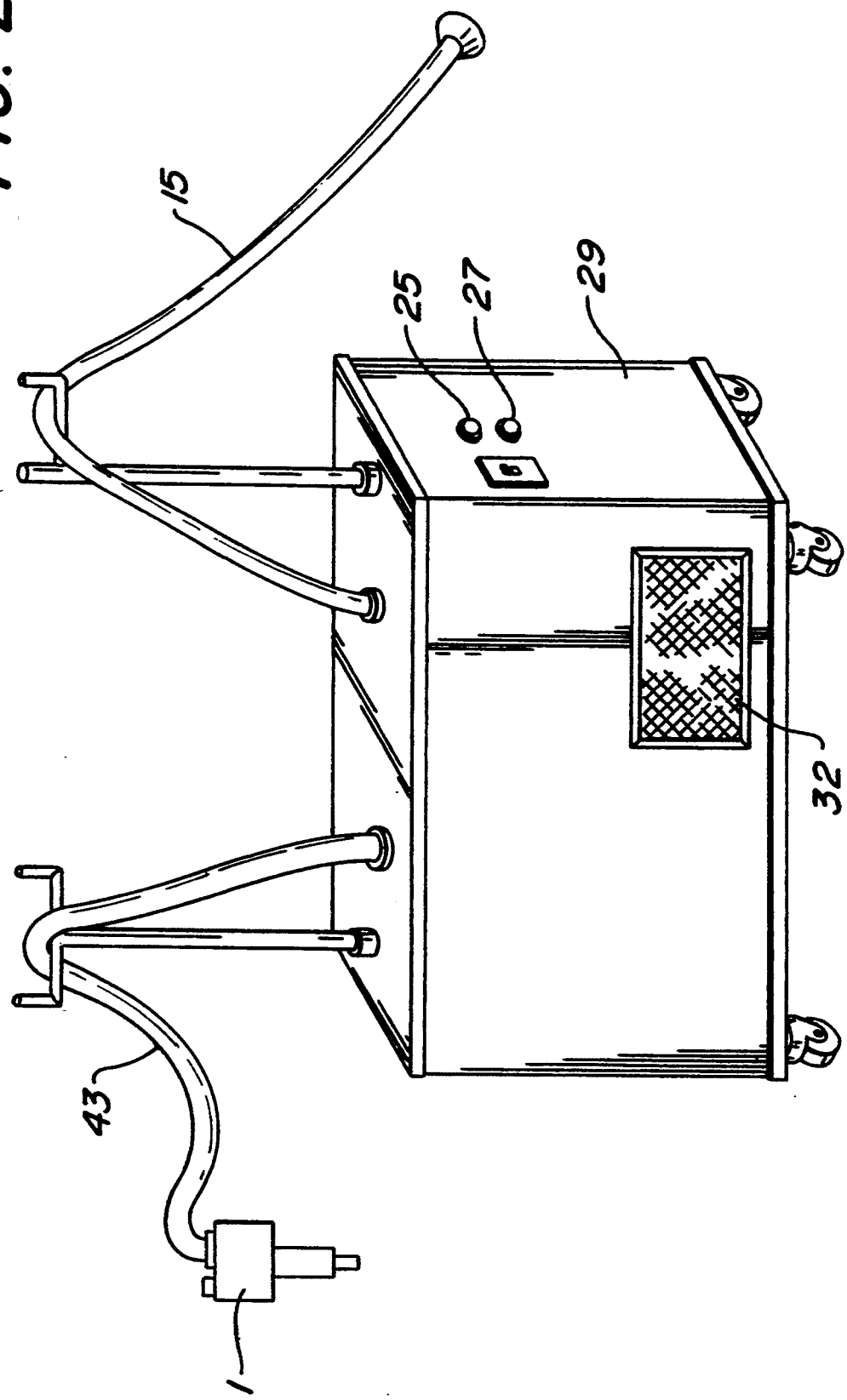
FIG. 2 is a top, front right isometric view of the off-board regeneration console, which forms a part of the present invention.

Referring now also to FIG. 2, super-heated air is provided and controlled by a regeneration heater console 29 which may be either a mobile or stationary. The heat supply module 1 is a hand-held device which is affixed to the end of the air delivery hose 43. The heat source within the heat module 1 is an electric resistance air heater. Simultaneously, a vacuum pump housed in the console draws a vacuum on the downstream chamber area of the catalyst via the vacuum hose 15 and vacuum port 10 through vacuum probe 23 within the catalyst casing 9. Both hoses 15, 43 are attached to the casing by quick disconnect fittings. Sufficient vacuum is applied by the vacuum pump to draw a maximum of about seven cubic feet per minute of 1200° F. heated air through the monolith. After the recombustion air ignites the carbon, the air and combustion byproducts exit the catalyst outlet port and are drawn through the vacuum hose 15 to a filter and cooling heat exchanger within the console 29 before being vented to atmosphere through vent 32. The console includes function indicator lights 25 and 27. The console also houses temperature-actuated relay, process timers and, heat exchanger, cooling fan, and other electrical components shown in FIGS. 3 and 4 needed to perform the regeneration process. This console independently provides the delivery, monitoring, application and extraction of oxygen-rich, superheated, re-combustion air.

The air-handling systems within the console are diagrammatically depicted in FIG. 4 which shows the individual diagrams for both the positive-pressure hot air and vacuum exhaust air circuits. Ambient air 59 is drawn into the air delivery circuit by pump 42 which provides the flow of air through delivery hose 43. Shut-off valve 40 is positioned just downstream of pump 42. Air delivered through line 43 is provided to the heat module 1. A heating element within the heat module raises the temperature of the airflow to provide a low-pressure stream of super-heated air 60. The vacuum components draw a flow of air 46 through vacuum hose 15 which is connected to the catalyst casing as described above. Cooling fan 17 and coil or heat exchanger 16 remove heat from the vacuum airflow just upstream of its entry into filter 18 before passing through vacuum pump means 20 which then exhausts the airflow 47 to the atmosphere.

Referring again to FIG. 1, this push-pull method ensures that the hot air provided through the channeling tube 6 will travel through the monolith 8, rather than escaping upstream of the catalyst. This eliminates the need to have the engine running or for exhaust pipe bypass valves. The push-pull operation causes a slight high pressure area 44 just upstream of the catalyst and the slight vacuum in the area 45 of the downstream chamber side of the catalyst. The amount of vacuum is selected to provide a total hot airflow rate through the monolith which is equal to the total incoming hot airflow rate. The total flow rate out of the regeneration exhaust port will be higher, as it includes the added volume of dilution air from the downstream tailpipe 4. This system creates a positive flow of super hot air only in the catalyst area and eliminates the need to block the openings and exit to the catalyst during regeneration. If a lower vacuum and increased control is desired, a tailpipe flap valve 52 may be provided and closed to reduce downstream tailpipe dilution air during regeneration.

Figure 3:
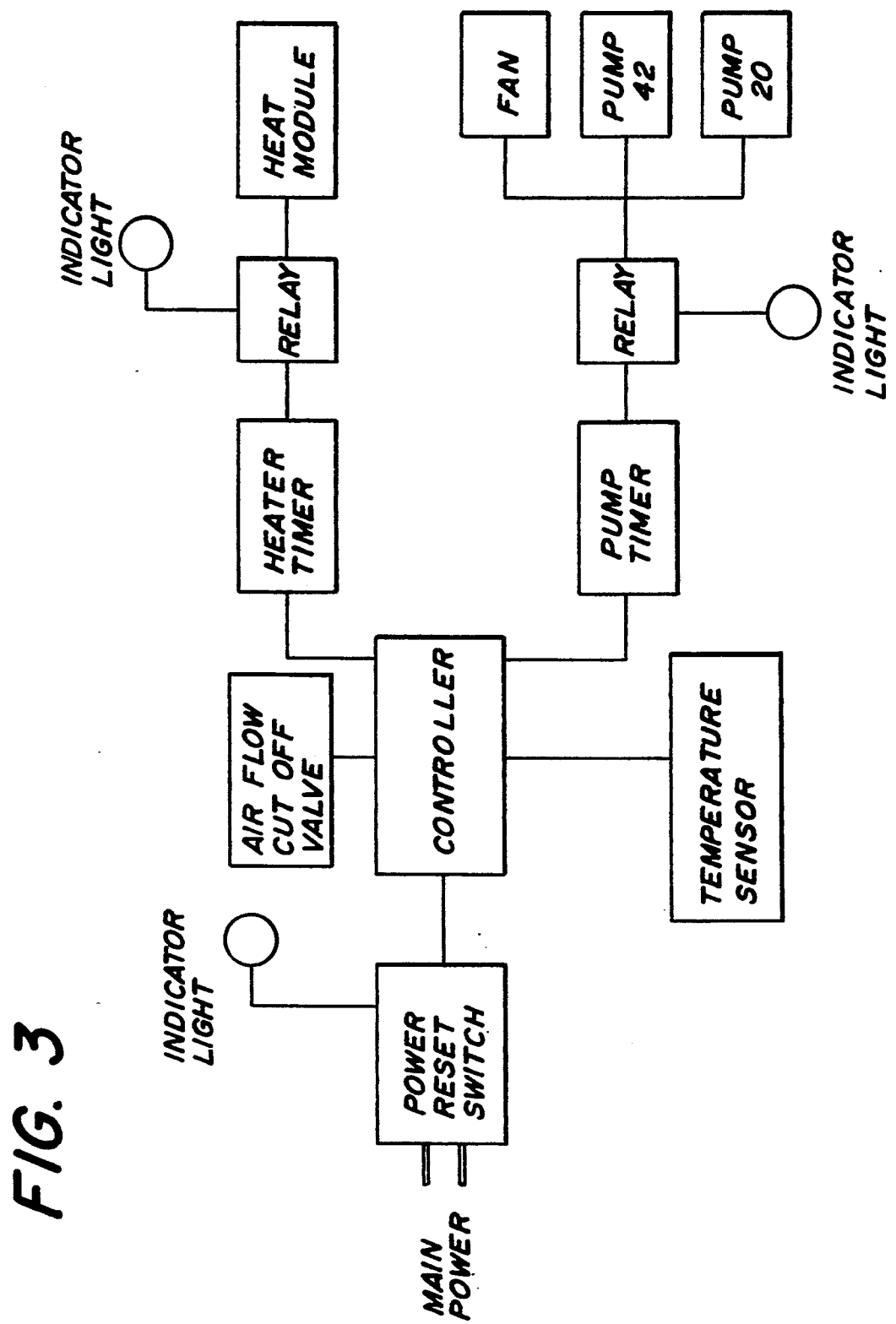
FIG. 3 is an electrical diagram of the regeneration console components.

As depicted in FIG. 3, the internal monolith temperature sensor is coupled to a console controller to regulate the amount of heat delivered to the monolith. Because the heating element is regulated by the controller and it is sufficiently removed from the heat impact points on the monolith, no radiant heat is applied. This prevents undesirable hot spots which will occur when a radiant heat source is located too close to any surface on the monolith structure. Hot spots can cause local overheating and premature ignition in an undesirable pattern throughout the monolith.

The problem with overheating is solved by the present invention because the present process is one of slowly baking, rather than quickly combusting the carbon particulate. The amount of heated combustion air from the console is unlimited, controllable, and delivered in a manner as to support complete, slow, steady combustion. There is no reliance on additional heat generated by the combusting materials to propagate combustion. Also, since only a small volume of heated re-combustion air enters chamber 44 (see FIG. 1) upstream of the catalyst (approximately 7 cfm), only a volume of regeneration air which directly relates to the number and degree of open chambers within the catalyst (degree of clog) can be drawn into the chambers of the ceramic monolith. This throttles the burn rate and self-meters only enough hot air through the monolith that the process can safely use. The inlet air temperature is regulated to 1200° F., which will be achieved in all parts of the catalyst after about seven minutes. The catalyst can be restored to full efficiency in less than ten minutes.

Referring now to FIG. 5, greater detail of the channeling tube 6 is shown. The tube is provided with a vertical array of airflow holes 50 which are directed toward the monolith when the tube is installed into the casing. As also shown in FIG. 1, fitting 36 secures the tube to the inside of the casing just upstream of the monolith, extending the channeling tube transversally across the center of the casing. Air holes 50 are graduated in size from larger to smaller, top to bottom, as shown in this figure. The size and location of air holes directs the super-heated air at many points across the face of the monolith.

A unique feature of this invention is its ability to completely clean a catalyst which is only marginally clogged with carbon. A marginally-coated condition is more typical of a catalyst as compared to a heavily-coated particulate trap. A lightly-coated ceramic monolith, whether catalyst or trap, is not conducive to the self-sustaining combustion technique required by all other electric heater regeneration systems. This new regeneration system has the ability to bring the entire monolith structure up to a temperature of 1200° F. without the aid of spontaneous carbon combustion or exhaust gas, regardless of the degree of particulate loading. This is an important feature if regeneration is to occur as scheduled maintenance, regardless of the degree of clogging.

OPERATION

First, the heat module and vacuum hoses from the console of FIG. 2 are attached to their respective ports on the catalyst casing as shown in FIG. 1. Next, the tailpipe valve (optional) is closed, and the air pumps and heat module are activated. With regard to FIG. 4, the air pumps create a flow of super-heated air into and out of the catalyst casing. Referring to FIG. 4, the exhaust gas from the regeneration process is extracted from the exit port, passed down the vacuum tube 15, through a filter element 18 and a heat exchanger 16 before final exhaust 47 to the atmosphere. The regeneration exhaust heat exchanger 16 lowers the temperature of exhausting gas before it passes through the vacuum pump 20. The filter element protects the regeneration console operator from unburned suspended carbon particles which are known to be harmful.

During startup of the regeneration process, heat losses from the channeling tube and attaching hardware on the catalyst casing are soon overcome and the incoming regeneration air temperature builds at the leading face of the ceramic monolith where it impacts and lights the carbon. The small flow of air travels down the chambers raising the temperature and igniting accumulated carbon particles along the way. High temperatures gradually develop first at the face, then throughout the entire monolith. This ensures complete combustion of all carbon material. Depending upon the degree of carbon loading, the carbon may actively support combustion or slowly bake as temperatures approach 1200° F.

As shown in FIG. 1, a temperature sensor 7 is located midway along the length of the ceramic monolith 8 in the area of the central core. This sensor reports temperature to the regeneration console controller shown in FIG. 3. If the temperature is too high, the flow of re-combustion air and vacuum is stopped and an air shut-off valve 40 as shown in FIG. 4 is closed. The shut-off valve is positioned just downstream of pump 42 to cut off the air supply to the air delivery hose 43. As the temperature falls within acceptable limits, the valve will re-open and heat and air will once again be reintroduced. This allows the re-combustion rate to be retarded or stopped at any point during the process if ceramic overheating is sensed. It can then be restarted when the temperature sensor indicates a lower acceptable temperature. Thus, the shut-off valve further protects against overheating the central core of the monolith.

The timers depicted in FIG. 3 provide heat and airflow for approximately seven minutes, at which point monolith temperatures will have reached a uniform 1200° F. At this point, the power to the heater is interrupted by the heater timer; however, the pump timer continues operation of the vacuum pump 20 and delivery air pump 42, and airflow continues through the catalyst for approximately two additional minutes. This cools the heat module and intake hardware. When all the carbon has burned off, the catalyst is fully regenerated. After this is completed, the heat module, vacuum hose and temperature sensor are removed. Then, caps are placed on the catalyst regeneration ports, the tailpipe is open, and the process is complete.

This invention is not only novel in the approach to existing trap regeneration problems, but it also provides a plausible mechanism to utilize catalytic reduction converters with diesel exhaust, while still maintaining long term durability and reduction efficiency. This is achieved at low cost, which will allow wide usage in retrofit applications. In light of the immediate need to reduce emissions from existing diesel vehicles, this is particularly important when considering diesel-powered trucks and busses that tend to be rebuilt several times over and remain in operation for longer periods. The overwhelming percentage of existing diesel-powered, heavy-duty vehicles will still be operating for another seven to ten years. These "in use" vehicles will not be affected by new equipment emissions technology.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. An apparatus for regenerating a filter trap used to collect particles from the exhaust gas of an internal combustion engine, comprising:
   an outer casing containing a filter trap centrally located therein, said casing having entrance and exit ports, the entrance port connected to and receiving exhaust gas from an exhaust pipe of an internal combustion engine and the exit port connected to and discharging filtered exhaust gas into a tailpipe;
   means for providing a flow of super-heated air to a point just upstream of the filter trap to ignite particulates contained therein; and
   a vacuum pump connected to said casing just downstream of said filter trap to assist the flow of said super-heated air through the filter trap and to draw off said exhaust gas.

2. The filter trap regenerating apparatus of claim 1, further including a vacuum air hose which is detachably connected between said vacuum pump and an outside of the casing just downstream of said filter trap.

3. The filter trap regenerating apparatus of claim 2, wherein said means for providing a flow of super-heated air to said filter trap comprises an air delivery hose detachably connected to the outside of the casing just upstream of said filter trap.

4. The filter trap regenerating apparatus of claim 3, further including a transversally extending air channeling tube affixed to an inside of said casing just upstream of said filter trap and connected to said air delivery hose, said tube including ports facing said filter trap for directing said super-heated air thereto.

5. The filter trap regenerating apparatus of claim 4, further including a vacuum probe affixed to said casing in fluid communication with said vacuum air hose and extending inside of said casing just downstream of said filter trap.

6. The filter trap regenerating apparatus of claim 5, wherein said filter trap is a ceramic monolith having a honeycomb structure.

7. The filter trap regenerating apparatus of claim 6, further including means for measuring pressure within said casing at points just upstream of, and just downstream of, said filter trap.

8. The filter trap regenerating apparatus of claim 7, further including a tailpipe valve for closing off airflow through said tailpipe downstream of said vacuum probe.

9. The filter trap regenerating apparatus of claim 8, further including a regeneration console detachably connected to said filter trap casing by said air delivery hose and said vacuum air hose, said console containing an air pump connected to said air delivery hose for providing super-heated air to said filter trap, and further including said vacuum pump for drawing the exhaust gas from a downstream side of said filter trap.

10. The filter trap regenerating apparatus of claim 9, further including an air-heating element affixed to an end of said air delivery hose adjacent to said casing for heating the flow of air through said air delivery hose to a temperature of at least 1,000 degrees F.

11. The filter trap regenerating apparatus of claim 10, wherein said air and vacuum pump within said console are controlled by a timer switch which interrupts an electrical supply to said pumps to limit operating to said pumps to a preset time.

12. The filter trap regenerating apparatus of claim 11, further including a controller interconnecting a temperature sensor on said filter trap, said air pumps, said timer switch and said heating element to control the heat within said filter trap.

13. The filter trap regenerating apparatus of claim 12, wherein said temperature sensor is located centrally within said filter trap which signals said controller.

14. The filter trap regenerating apparatus of claim 13, further including means within said console for cooling and filtering said vacuum hose airflow upstream of said vacuum pump.

15. The filter trap regenerating apparatus of claim 14, wherein said console is carried on a wheeled cart.

16. The filter trap regenerating apparatus of claim 15, wherein said hoses are flexible.

17. A method for regenerating a filter trap used to collect particles from the exhaust gas of an internal combustion engine comprising:

providing an outer casing containing a filter trap centrally located therein, said casing having entrance and exit ports, the entrance port connected to and receiving exhaust gas from an exhaust pipe of an internal combustion engine and the exit port connected to and discharging filtered exhaust gas into a tailpipe;

providing a flow of super-heated air to a point just upstream of the filter trap to ignite particulates contained therein; and applying a vacuum just downstream of said filter trap with a vacuum pump to assist the flow of super-heated air through the filter trap and to draw off said exhaust gas.

* * * * *